Jan. 27, 1931.  L. A. FERGUSON  1,790,093
CULTIVATOR APPLIANCE
Filed Nov. 4, 1929   2 Sheets-Sheet 1
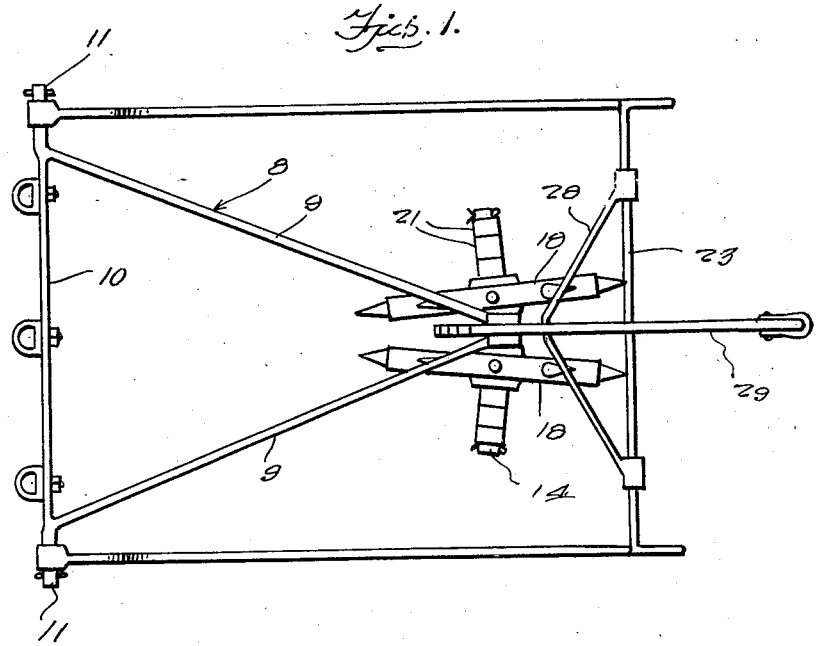
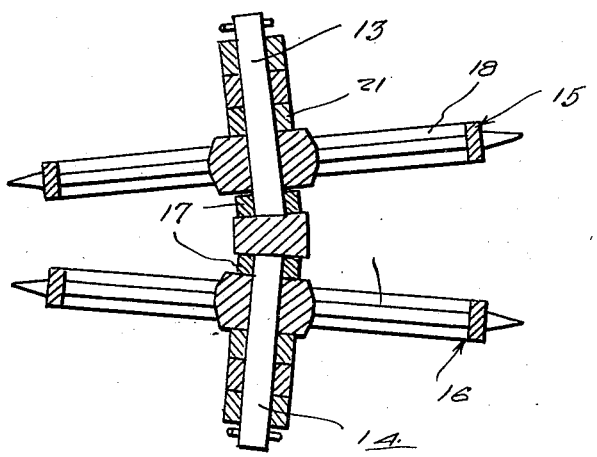
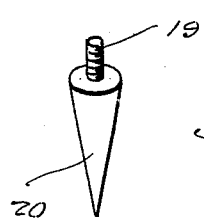
Inventor
L. A. Ferguson
By Clarence A. O'Brien,
Attorney Jan. 27, 1931.   L. A. FERGUSON   1,790,093
CULTIVATOR APPLIANCE
Filed Nov. 4, 1929   2 Sheets-Sheet 2
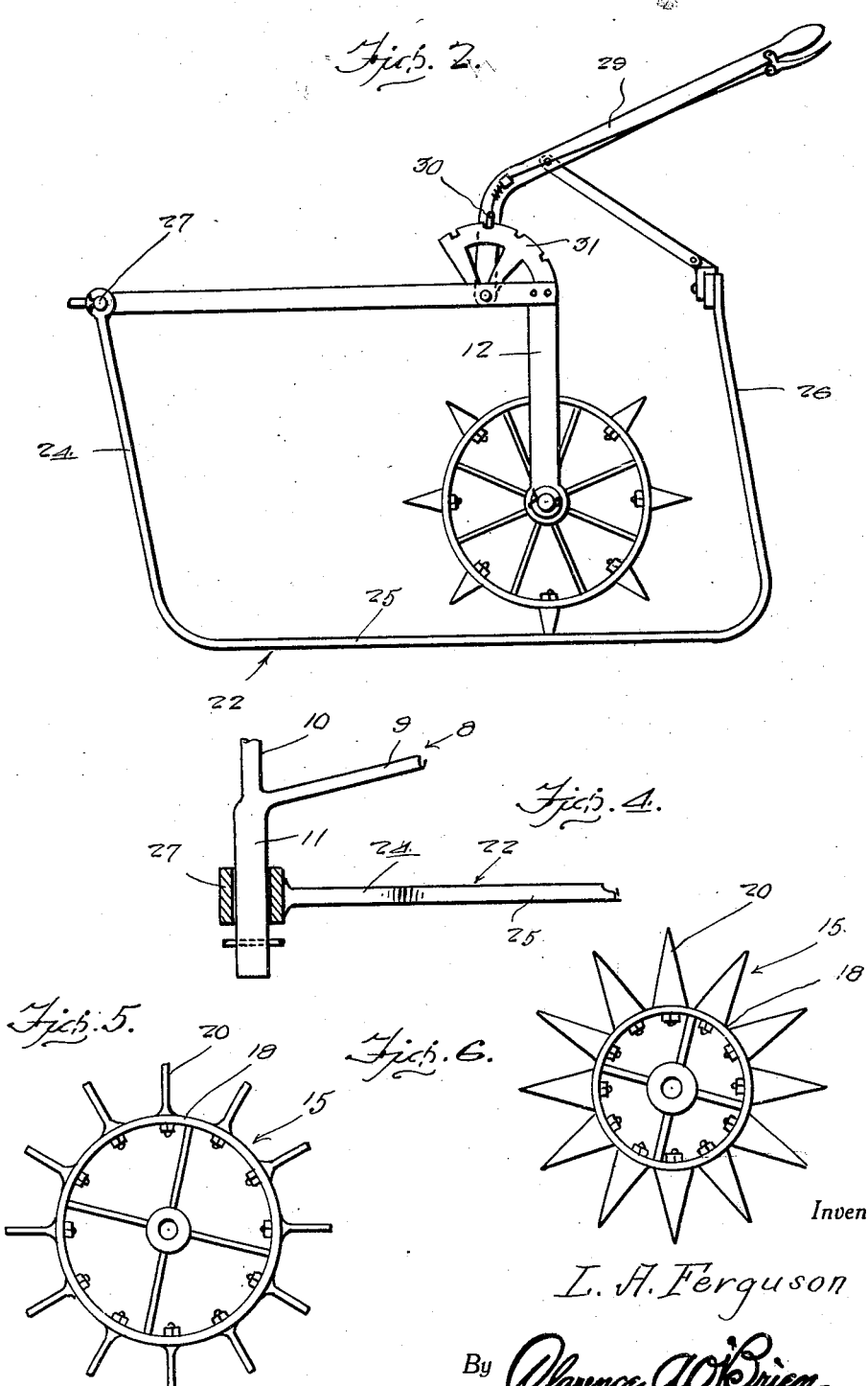
Inventor
L. A. Ferguson
By Clarence A. O'Brien
Attorney Patented Jan. 27, 1931

1,790,093

UNITED STATES PATENT OFFICE

LINCOLN A. FERGUSON, OF ARAPAHOE, COLORADO

CULTIVATOR APPLIANCE

Application filed November 4, 1929. Serial No. 404,731.

This invention relates to agricultural appliances and has more particular reference to a new type of implement which is especially adapted for cultivating and pulverizing soil in the plant rows.

It is a matter of common knowledge that it is difficult for young plants to thrive when they must break through a comparatively hard crust-like covering of dirt. As a general rule after the seed is planted and the ground is subjected to heavy or steady rain, the previously loose soil becomes caked and forms a hard crust which, as before stated, is difficult for the young plants to penetrate.

With the foregoing in mind I have evolved and produced a portable auxiliary cultivator which can be attached to a plow, a harrow or any suitable draft appliance, the same being especially constructed to move along the rows for loosening and pulverizing the soil to render it more susceptible to maturing young plants.

Briefly stated, the appliance comprises a frame which is constructed to be attached to an appropriate draft appliance, this frame carrying a depending standard on which one or more spike equipped wheels are mounted for rotation. These wheels are so arranged as to permit them to move directly over the rows or on opposite sides and close to the planted seeds. The frame is associated with an adjustable ground engaging runner structure, thereby making an ideal combination of parts for fulfilling the requirements of an invention of this class in a highly satisfactory manner.

The particular details will become more readily apparent from the following description and drawings.

In the drawings:—

Figure 1 is a top plan view of an appliance constructed in accordance with the present invention.

Figure 2 is a side elevational view of the same.

Figure 3 is a fragmentary horizontal sectional view through the calk equipped wheels.

Figure 4 is a fragmentary elevational and sectional view showing a hinged joint to meet the runner support and the frame.

Figure 5 is a detail view of a slightly modified form of pulverizing wheel.

Figure 6 is a view of a still further form thereof.

Figure 7 is a perspective view of one of the dependable calks.

As shown better in Figures 1 and 2, the main frame is designated generally by the reference character 8 and comprises a pair of rearwardly converging longitudinal bar members 9. These are connected at their forward end to a cross piece 10, making somewhat of a triangular supporting frame. At the end of the part 10 are extensions which define pintles 11. At the point of convergence of the bars 9 is a depending standard 12 on the lower end of which we find outstanding stub axles 13 and 14, respectively, as shown better in Figure 3. Incidentally there may be a pair of wheels or a group of four, six or eight wheels as desired. On the inner end portions of the stub axles are spacing and bearing washers 17 which cooperate with the hub portions of the wheels. The wheels it will be noted, are of the spoke equipped type and have ring like rims 18. In this connection it will be observed that the rims are formed with screw threaded holes to accommodate the correspondingly threaded shanks 19 of the pointed detachable ground engaging and pulverizing calks 20. I also invite attention to the supplemental washers 21 on the extended end portions of the axles. These are to permit the distances between the wheels 15 and 16 to be regulated. I mention too that the axles 13 and 14 are arranged at angles with respect to each other as to cause the forward or front portions of the wheels to converge into close spaced proximity as shown so as to properly straddle the row.

I next call attention to the runner or ground engaging device generally designated by the reference character 22. This comprises a frame which includes a pair of spaced parallel U-shaped members connected together by a cross-bar 23 at the back. In other words each runner includes an upstanding front portion 24, a horizontal ground engaging slide 25 and an upstanding forwardly and upwardly inclined rear portion 26. The upper ends of the forward portion 24 terminate in knuckles 27 which are hingedly mounted on the aforesaid pintles 11. In addition I provide an adjusting connection between the rear end portion of the runner structure and the main frame 8. This comprises link connectors 28 which are fastened to a pivotally mounted lever 29. This lever is mounted on the rear portion of the frame 8 and provided with a pawl 30 for selected engagement with the keeper notches or seats in the relatively stationary segments 31 on the frame 8. This allows the runner structure to be elevated or lowered to regulate the depth of penetration of the calks 20.

I call attention to the fact that the construction of the ground engaging wheels may be varied to the extent of increasing or decreasing the diameter thereof as well as increasing the size and shape of the ground engaging calks. For instance, as shown in Figure 5 the calks are somewhat flat in configuration and in Figure 6 they are in the form of relatively large conical spurs.

The gist of the invention, it will be understood, is in the provision of a runner supported means wherein the runner structure is vertically adjustable to regulate the depth of the ground engaging spurs, together with means for raising and lowering the runner structure, and novel means for supporting the wheels whereby they may be arranged in converging pairs to provide the desired distance between the wheels for proper pulverizing and cultivating of the soil when moving the device along the rows. The runners obviously straddle the row and the rotating wheels straddle on the top of the row. It is thought, however, that persons skilled in the art to which the invention relates will be able to obtain a clear understanding of the construction, operation, features and advantages of the invention after considering the description in connection with the drawings. Therefore, a more lengthy description is regarded as unnecessary.

Minor changes in shape, size, re-arrangement of details coming within the field of invention claimed may be resorted to in actual practice if desired.

I claim:

1. In an appliance of the class described, a frame including draft attaching means at its front and a depending standard at the rear end, said standard being provided adjacent its bottom with a pair of outstanding oppositely directed stub axles, said stub axles being disposed at outwardly diverging relationship with respect to each other so that they incline slightly forwardly, a pair of rotary cultivating elements carried by said axles, and a plurality of removable adjusting washers on the axles cooperable with the hub portions of the wheels whereby to permit the distance between the latter to be adjusted.

2. In a cultivator appliance of the class described, a supporting frame adapted to assume a substantially horizontal position including a front bar having draft attaching means and a pair of rearwardly converging longitudinal bar members, a vertical depending standard at the inner end of said members provided at its lower end with a pair of oppositely directed outstanding horizontally disposed stub axles, rotary wheels including hub portions mounted for rotation on said axles, said wheels including detachable ground engaging pointed calks, together with a plurality of adjusting washers on the stub axles whereby to permit the distance between the wheels to be regulated according to the width of the row.

3. In a cultivator appliance of the class described, a supporting frame adapted to assume a substantially horizontal position including a front bar having longitudinal bar members, a vertical depending standard at the inner end of said members provided at its lower end with a pair of oppositely directed outstanding horizontally disposed stub axles, rotary wheels including hub portions mounted for rotation on said axles, said wheels including detachable ground engaging pointed calks, together with a plurality of adjusting washers on the stub axles whereby to permit the distance between the wheels to be regulated according to the width of the row, and a hingedly mounted runner structure supported at its forward end on said frame, together with adjusting means on the rear portion of the frame operatively connected to the corresponding portion of the runner structure.

4. In a cultivator of the class described, a supporting frame adapted to assume a substantially horizontal plane comprising a front bar whose opposite ends function as pintles, together with a pair of rearwardly converging longitudinal bar members, said longitudinal bar members being connected at their rear ends with a depending standard, said standard being provided at its bottom with axles, a pair of forwardly converging wheels mounted on said axles and provided with pointed ground engaging pulverizing elements, a runner structure comprising a pair of substantially spaced parallel U-shaped members whose forward portions are provided with hinged knuckles hingedly mounted on said pintles, a segment on said frame, a lever pivotally mounted on said frame, a pawl carried by said lever and cooperable with said segment, and an operating connection between the lever and the rear end portion of said runner structure.

In testimony whereof I affix my signature.

LINCOLN A. FERGUSON.